James L Kimball
INVENTOR.

BY John W. Poteet Jr.
ATTORNEY.

Jan. 2, 1940.    J. L. KIMBALL    2,185,671
CONTROL APPARATUS FOR THE REGULATION OF PRESSURE
Filed April 14, 1937    3 Sheets-Sheet 3

James L. Kimball
INVENTOR.

BY John W. Poteet Jr.
ATTORNEY.

Patented Jan. 2, 1940

2,185,671

UNITED STATES PATENT OFFICE 2,185,671

CONTROL APPARATUS FOR THE REGULATION OF PRESSURE

James Lewis Kimball, Danvers, Mass., assignor to Ruggles-Klingemann Mfg. Co., Salem, Mass.

Application April 14, 1937, Serial No. 136,876

10 Claims. (Cl. 50—10)

This invention relates to control systems and more particularly to improvements in control apparatus for the regulation of pressure, and is of the class in which a secondary pressure such as air is used as the actuating force.

The object of this invention is to stabilize the secondary pressure, although the primary pressure may tend to pulsate widely, and thereby eliminate objectionable oscillations known in the art as hunting, which it would be impossible to eliminate by direct operation from the primary pressure.

To accomplish this result I operate a leak in and a leak off needle valve from a "Bourdon" tube with the secondary or actuating pressure exposed to the outside of the tube and the primary pressure connected to the inside of the tube. The secondary pressure can be a reduction of the primary pressure through the needle valve operation, or it can be an independent source of supply, preferably air.

My invention is adapted to the control of pressure over a predetermined range, sometimes referred to as "band", in which the pressure setting of the apparatus would be consistent with the variations in volume demand. This method of control is what is commonly referred to as a "follow up system" for stabilizing operation. In my invention the "follow up" is effected by variations in the actuating pressure counteracting variations in the primary pressure over the entire operating range or band. It may also be used for the regulation of temperature by means of a type of thermostat in which an expansible fluid varies in pressure due to variations in temperature.

My invention is particularly adapted to the control of relatively high pressures, in which the pressure responsive device would essentially be of low sensitivity, and with the primary pressure acting on one side of the high pressure responsive device, as on the inside of a Bourdon type, to control a secondary pressure of low static head to operate a second pressure responsive device, of high sensitivity, which in turn would actuate a valve or the like to control the primary pressure.

The stabilizing feature, as before stated, is in subjecting the outside of the Bourdon tube to the secondary pressure which actuates the low pressure responsive device and in this way the tube so controls the leak in and leak off valves that pulsations in the primary pressure are not reflected to any great extent in the secondary pressure.

Referring to the drawings.

The various figures are shown principally in section to more clearly illustrate the mode of operation.

Figure 1:
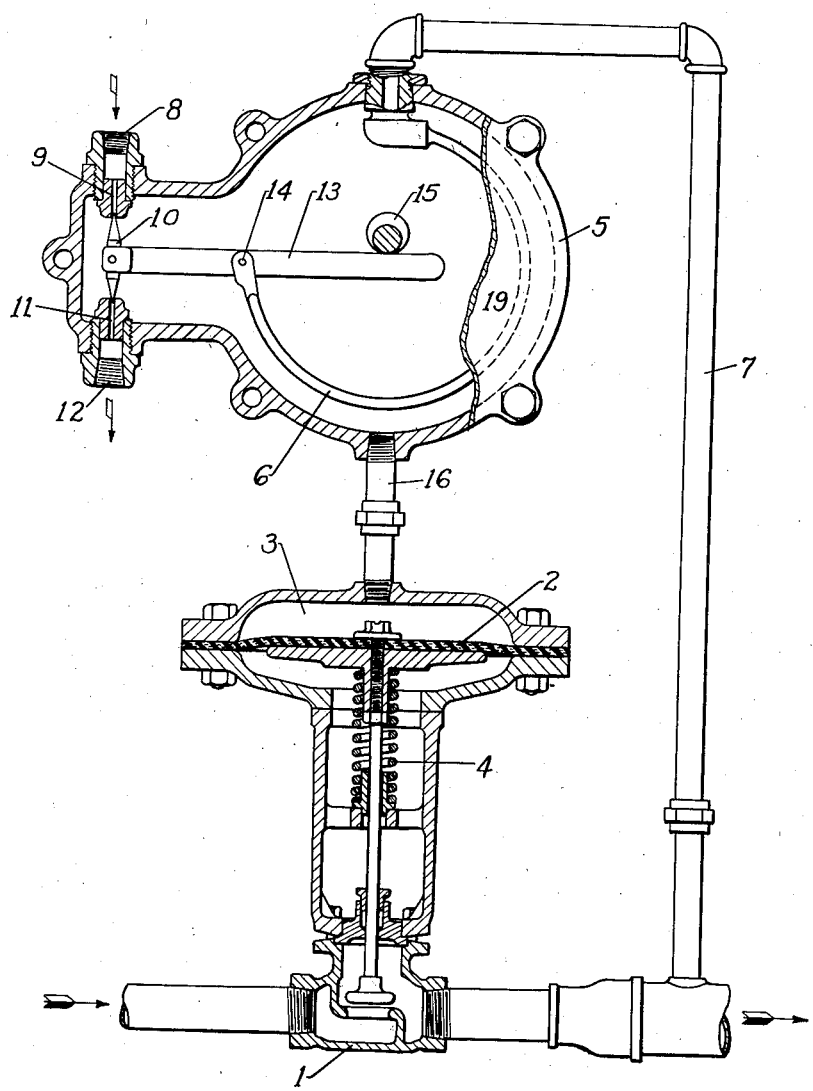
Fig. 1 shows the application to a pressure control system in which the secondary pressure is an independent source of supply.

Referring to Fig. 1, a valve 1 for controlling the primary pressure is operated by a large diaphragm 2 of high sensitivity at a relatively low pressure in chamber 3, the valve opening movement being effected by a spring 4. An air tight casing 5 houses a Bourdon tube 6 and the pressure to be controlled is connected from the outlet of valve 1 to the inside of the Bourdon tube by means of pipe 7.

A secondary pressure preferably air is connected at 8 and is admitted to casing 5 through orifice 9 by needle valve 10. This same needle valve which is double ended also controls the discharge of air pressure from casing 5 through orifice 11 and connection 12. The needle valve 10 is operated by the Bourdon tube 6 by means of lever 13 pivoted at 14 and adjustable by means of a cam 15 which is operated from the outside of the case 5.

In the operation of this device the cam 15 is adjusted to close orifice 9 by needle valve 10 and open orifice 11. When the primary pressure within the Bourdon tube reaches a pressure to which the cam has been adjusted the tube expands or straightens thereby tending to open orifice 9 and close orifice 11 which builds up air pressure within casing 5 which pressure acts alike on the outside of the Bourdon tube 6 and on the upper side of diaphragm 2, the casing 5 being connected to chamber 3 by pipe 16.

Assuming the primary pressure connected to the inside of the Bourdon tube was 1000 pounds per square inch and the secondary pressure within casing 5 and acting on diaphragm 2 varies between 5 and 10 pounds per square inch for a complete opening and closing movement of the valve 1 then it will be seen that this 5 pound range acting on the outside of the tube will counteract a like range acting on the inside of the tube and therefore the total operating range of the primary pressure for a complete opening and closing movement of valve 1 will be 5 pounds.

Let us assume further that the primary pressure of 1000 pounds was connected direct to chamber 3 then it will be seen that diaphragm 2 would have to be made much smaller and the gradient of spring 4 would be much greater to counteract this high pressure and consequently the operating range of valve 1, for a complete opening and closing movement would be much wider. However, this would be true of any relay operation and the novel feature of my invention is not in effecting a close operating range but in stabilizing the operation at this narrow range.

It will be understood that pressure controls operating over a wide pressure range will ordinarily be much more stable than one operating at so-called "dead beat", or a narrow range, and it is therefore the object of my invention to stabilize operation and at the same time effect close regulation of a relatively high pressure. This result is accomplished by a novel arrangement of relay control whereby pulsations in the primary pressure are not reflected in the secondary pressure and, therefore, the primary pressure tends to become stabilized.

Assuming the primary pressure acting within the Bourdon tube tends to pulsate then at the high point of the pulsating cycle the tube is expanded which allows more air to enter through orifice 9 which increases the pressure within casing 5 and this increase in pressure acting on the outside of the Bourdon tube counteracts the increase in the primary pressure which causes the spring to return to its normal position thereby tending to close orifice 9 and open orifice 11 establishing equilibrium. Likewise at the low point of the pressure cycle orifice 9 tends to be closed and orifice 11 opened which reduces the air pressure within casing 5 and on the outside of the Bourdon tube thereby again counteracting the lower pressure within the tube and at the same time causing orifice 11 to slightly close and orifice 9 to open again establishing equilibrium or a damping out effect of the pulsation. In other words this novel arrangement fights every tendency of an unstable operation and altho the primary pressure may tend to pulsate widely due to volume fluctuations or other causes, the secondary pressure pulsations will be relatively small.

Figure 2:
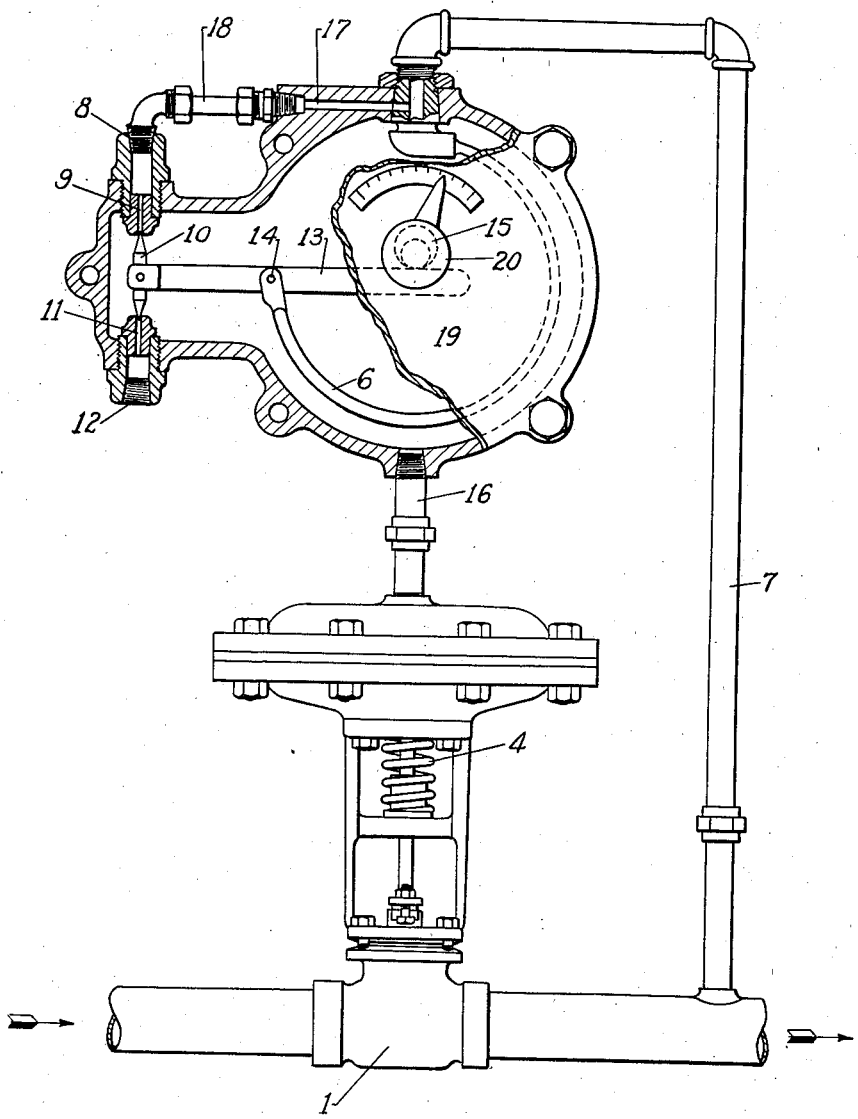
Fig. 2 shows the application to a pressure control system in which the actuating or secondary pressure is a reduction of the primary pressure.

Referring to Fig. 2 it will be noted that in this embodiment of my invention the secondary pressure is a reduction of the primary pressure and is taken from the Bourdon tube connection through port 17 and pipe connection 18. In this illustration the casing cover 19 is shown in part to illustrate the method of adjustment for changing pressure setting of the Bourdon tube. The cam 15 is adapted to be rotated by the thumb nut 20 from the outside of the casing cover and this adjustment acting on lever 13 so changes the pressure setting of the Bourdon tube 6 as to cause an increase or decrease in the primary pressure to effect a centering of the needle valve 10 at its neutral position.

Figure 3:
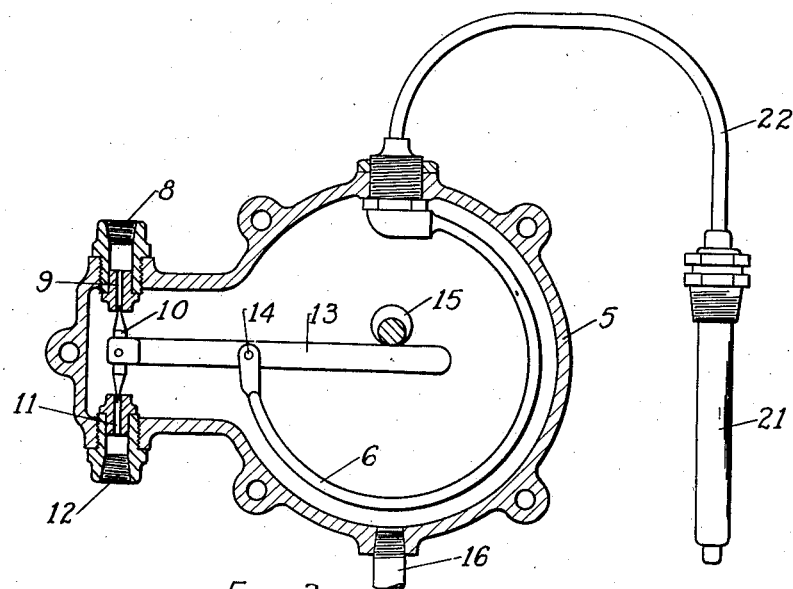
Fig. 3 shows the application to a temperature control system.

Referring to Fig. 3, a thermostatic bulb 21 of the ordinary type contains an expansible fluid which increases and decreases the pressure within the Bourdon tube 6, acting through the flexible tube 22 in accordance with variations in temperature to which the bulb 21 is subjected, otherwise the principle of operation is the same as in Fig. 1.

Figures 4, 5:
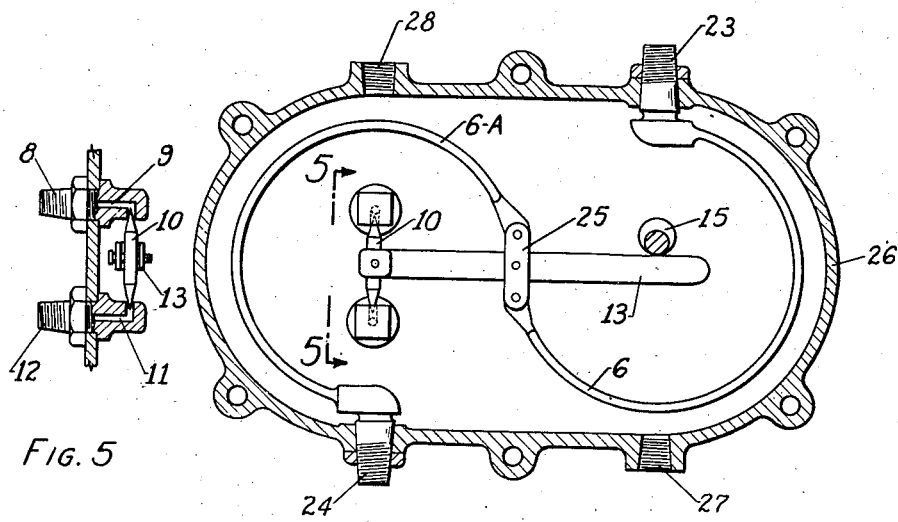
Fig. 4 shows the application of my invention to a differential pressure control.
Fig. 5 shows a section through the leak in and leak off valve control.

Referring now to Figs. 4 and 5 this shows a preferred arrangement of a differential pressure control. The Bourdon tube 6 is connected at 23 with the high or up stream pressure while the tube 6A is connected at 24 with the low or down stream pressure. The cam 15 is then adjusted to maintain a constant pressure differential between the two pressures. This is accomplished by the joint operation of lever 13 through connecting link 25 which controls the needle valve 10 to admit and exhaust a secondary pressure to and from the casing 26.

It will be understood that variations in the secondary pressure within the casing 26 is connected at either 27 or 28 with the diaphragm chamber 3 as shown in Fig. 1 and this operates the diaphragm 2 against the force of spring 4 to open and close valve 1 and regulate the difference in pressure between the inlet and the outlet of the valve.

In this application, which would be one regulating volume flow by maintaining a constant differential pressure across a valve or orifice, the tube 23 would be connected to the inlet of valve 1 or up stream side while tube 24 would connect to the outlet or down stream side of valve 1. Another application for differential pressure control would be maintaining a constant excess feed line pressure over that of the steam pressure for feeding steam boilers.

The present disclosures are merely for purposes of illustration as it is anticipated that many modifications are possible within the scope of the appended claims without departing from the spirit of the invention.

I claim:

1. A control system comprising a main fluid valve having an operating range within which it is movable to a plurality of positions, a Bourdon tube having inner and outer surfaces, means subjecting the inner surface thereof to the pressure on one side of said valve, means for effecting a pressure on the outside of said Bourdon tube which pressure is a relatively low percentage of that on the inside of said tube and differs from such pressure on the inside of said tube by a predetermined constant amount, whereby small percentage variations in pressure on the inside of said tube will effect large percentage variations on the outer surface thereof, said last-named means including pressure control means driven by deflections of said Bourdon tube for maintaining said predetermined constant pressure difference, and additional means for operating said main fluid valve solely by the pressure to which said outer surface of said Bourdon tube is subjected.

2. A control system for regulating a pressure within predetermined close limits without a hunting action comprising, in combination, a main fluid valve having a plurality of operating positions within its operating range, said valve having an outlet therefrom, a Bourdon tube having inner and outer surfaces, means subjecting the inner surface of said Bourdon tube to the pressure at said outlet of said valve, a chamber enclosing the outer surface of said Bourdon tube, said chamber defining relatively restricted inlet and exhaust apertures therethrough, means driven by deflections of said Bourdon tube for controlling the effective area of said exhaust aperture, said last-named means including means for simultaneously admitting fluid in said inlet aperture and exhausting fluid from said exhaust aperture when said Bourdon tube is in a predetermined position and for maintaining a pressure on the outer surface of said Bourdon tube which is a predetermined constant amount less than that on the inner surface of said tube, and resilient means subject to and operated by the pressure on said outer surface of said Bourdon tube for controlling the position of said valve.

3. In a control system, means for affecting a condition of a fluid, a Bourdon tube having inner and outer surfaces, means subjecting the inner surface of said tube to a pressure dependent on said condition of the fluid, a chamber enclosing the outer surface of said Bourdon tube, means driven by deflections of said Bourdon tube for simultaneously admitting fluid to and exhausting fluid from said chamber when said Bourdon tube is in a predetermined position and including means for maintaining a pressure on the outside of said Bourdon tube which is a predetermined constant amount different from that on the inner surface of said tube, and resilient means subject to and operated by the pressure on the outer surface of said tube for controlling said first-recited means.

4. A control system for controlling the conditions of a fluid within predetermined limits comprising pressure responsive means for controlling such conditions, first and second pressure chambers having a common resilient wall which wall includes spring-means for controlling the position of said wall according to the pressure difference on opposite sides of said wall, means subjecting one of said chambers to a pressure dependent upon a condition of said fluid, means responsive to the position of said wall for controlling the admission of and exhaust of fluid from said second chamber to admit fluid when the wall is in one extreme position, to exhaust fluid when the wall is in the opposite extreme position, and to simultaneously admit and exhaust fluid when said wall is in predetermined intermediate positions, and means subjecting said pressure-responsive means to the pressure of said second chamber.

5. A device for controlling a condition of a substance comprising a Bourdon tube having inner and outer surfaces, means subjecting the inner surface thereof to a pressure dependent upon said condition, a chamber defining relatively restricted inlet and exhaust apertures which chamber encloses the outer surface of said Bourdon tube, the inlet aperture being adapted for connection to a source of pressure, means driven by said Bourdon tube for controlling the effective areas of said apertures to admit pressure in the inlet aperture and to close the exhaust aperture when the Bourdon tube deflects to an extreme position in one direction due to excessive pressure within said tube and to close the inlet aperture and open the exhaust aperture when the Bourdon tube deflects to the other extreme position due to a low pressure on the inside thereof, said last-named means including means for simultaneously effecting admission of pressure in said inlet aperture and exhausting pressure from said exhaust aperture when said Bourdon tube is in a predetermined intermediate position, and means subject to and operated by the pressure on the outside of said Bourdon tube for controlling said condition in such a manner that in response to an increase in pressure on the outside of said Bourdon tube the condition will be affected to cause a decrease in pressure on the inside of said Bourdon tube.

6. A pilot control for differential pressure regulators comprising a pair of Bourdon tubes each having inner and outer surfaces, means subjecting the outer surfaces of both of said tubes to a common pressure, said last-named means including means responsive to the differential torques of said tubes for maintaining a pressure on the outside of said tubes which is a predetermined constant amount less than the average of the pressures on the inner surfaces of said tubes, said inner surfaces being adapted to be connected to two lines respectively, and means adapted for connection to said regulators for subjecting such a regulator to said common pressure.

7. A pilot control for pressure-responsive temperature regulators comprising a Bourdon tube having inner and outer surfaces, a temperature sensitive device adapted to be placed responsive to the temperature to be regulated comprising means for subjecting the inner surface of said tube to a pressure dependent upon said temperature to be regulated, means driven by deflections of said Bourdon tube for maintaining a pressure on said outer surface of said Bourdon tube which pressure is maintained a constant amount different from the pressure on said inner surface of said Bourdon tube, and means to which said pressure-responsive temperature regulators are adapted to be connected for subjecting such a regulator to the pressure existing on said outer surface of said Bourdon tube.

8. A device for controlling a motor in accordance with a condition comprising a Bourdon tube having inner and outer surfaces, means subjecting the inner surface of said tube to a pressure dependent upon said condition, means responsive to the deflections of said Bourdon tube for maintaining a pressure on the outside of said tube which is a predetermined constant amount less than that on the inside thereof, said last-named means being arranged to include means for causing the pressure on said outer surface to be a relatively low varying percentage of the pressure on said inner surface, and means subjecting the motor to the pressure on said outer surface of said Bourdon tube.

9. In a control system, a device to be controlled, pressure-motive means for controlling said device, a Bourdon tube having inner and outer surfaces, means subjecting the inner surface thereof to a primary pressure, a chamber enclosing the outer surface of said tube whereby the pressure in said chamber will act upon the outer surface of said tube, said chamber defining inlet and exhaust apertures which are relatively restricted as compared to the size of said chamber, means driven by deflections of said Bourdon tube for controlling the effective area of said exhaust aperture, said last-named means including means for simultaneously admitting fluid in said inlet aperture and exhausting fluid from said exhaust aperture when said Bourdon tube is in a predetermined position, and means subjecting the pressure-motive means to the pressure on the outer surface of said Bourdon tube.

10. A pilot control for regulators comprising a Bourdon tube having inner and outer surfaces as well as open and closed ends thereof, means supporting said open end and connected thereto to subject the said inner surface to a primary pressure, said supporting means having a casing cooperating therewith which casing is arranged to surround said Bourdon tube, the casing defining inlet and exhaust apertures therethrough, valves which respectively cooperate with said apertures, a pivot supported by said casing, the Bourdon tube having a relatively curved shape with said pivot being on the axis of the center of curvature, a lever operating about such pivot and also pivoted to the closed end of said Bourdon tube, and means cooperating with said lever and valves for opening one of said valves and closing the other when said lever deflects in one direction and closing such said one valve and opening the other when said lever deflects in the other direction, said last-named means including means for effecting partial opening of both valves when the lever is in an intermediate position; said casing defining a pressure outlet adapted for connection to the regulator.

JAMES L. KIMBALL.